No. 785,479. PATENTED MAR. 21, 1905.
S. DANCYGER.
PIN.
APPLICATION FILED APR. 12, 1904.
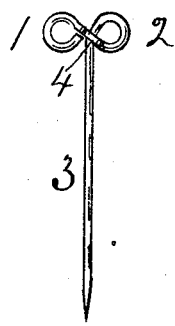
WITNESSES
INVENTOR
Simon Dancyger
BY R. Pickering
Attorney No. 785,479.

Patented March 21, 1905.

UNITED STATES PATENT OFFICE.

SIMON DANCYGER, OF DAYTON, OHIO.

PIN.

SPECIFICATION forming part of Letters Patent No. 785,479, dated March 21, 1905.

Application filed April 12, 1904. Serial No. 202,754.

*To all whom it may concern:*

Be it known that I, SIMON DANCYGER, a citizen of the United States, residing at Dayton, in the county of Montgomery and State of Ohio, have invented a certain new and useful Improvement in Pins; and I do hereby declare that the following is a full, clear, and exact description thereof, which will enable others skilled in the art to which it appertains to make and use the same, reference being had to the accompanying drawings, and to the numerals of reference marked thereon, which form a part of this specification.

My invention relates to improvements in pins, and is an improvement on Letters Patent issued to me September 9, 1902, No. 708,756.

The object of my invention is the construction of a pin with head formed of two loops, and is so formed as to give greater rigidity to the head by crossing the portion of the wire joining the two loops and so bending at the intersection that the said loops are substantially in the same plane.

The construction is illustrated in the accompanying drawing, in which the figure is an elevation of the pin.

Numerals designate the several parts of the pin.

The pin is formed of a single piece of wire and comprises circular loops 1 and 2 and the shaft 3, arranged at a right angle to the line joining the centers of said loops. In forming the pin the circular loop 2 is formed. From this loop the wire crosses the shaft at an angle and the like loop 1 is formed, and the end abuts the crossed portion. In use it will largely subserve the purpose of the ordinary clothing-pins.

Having described my invention, what I claim is—

As a new article of manufacture the pin formed of wire comprising the pointed shaft having two symmetrical loops the line joining the centers of which is at a right angle to said shaft, said loops joined by a section crossing the line of said shaft at an acute angle, and the end abutting said joining-section, substantially as described.

In testimony that I claim the foregoing as my own I affix my signature in presence of two witnesses.

SIMON DANCYGER.

Witnesses:
B. PICKERING,
SOL FLATAN.